US009407617B2

(12) United States Patent
Mowers et al.

(10) Patent No.: US 9,407,617 B2
(45) **Date of Patent: *Aug. 2, 2016**

(54) PASS-THRU FOR CLIENT AUTHENTICATION

(71) Applicant: Microsoft Licensing Technology, LLC, Redmond, WA (US)

(72) Inventors: David R. Mowers, Issaquah, WA (US); John A. Banes, Kirkland, WA (US); Daniel R. Simon, Kirkland, WA (US); Paul J. Leach, Seattle, WA (US)

(73) Assignee: Microsoft Licensing Technology, LLC, Remond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/147,998

(22) Filed: Jan. 6, 2014

(65) Prior Publication Data

US 2014/0189823 A1 Jul. 3, 2014

Related U.S. Application Data

(60) Continuation of application No. 12/647,327, filed on Dec. 24, 2009, now Pat. No. 8,627,440, which is a division of application No. 10/413,799, filed on Apr. 15, 2003, now Pat. No. 7,644,275.

(51) Int. Cl.
*H04L 9/32* (2006.01)
*H04L 29/06* (2006.01)

(52) U.S. Cl.
CPC ............ *H04L 63/08* (2013.01); *H04L 63/0807* (2013.01); *H04L 63/0869* (2013.01); *H04L 63/166* (2013.01); *H04L 63/0442* (2013.01); *H04L 63/12* (2013.01)

(58) Field of Classification Search
CPC ............ H04L 63/0442; H04L 63/0807; H04L 63/166; H04L 63/12; H04L 63/0869
USPC ............ 726/2, 5, 10; 713/155, 156, 159, 168; 709/223–226, 237; 380/279
See application file for complete search history.

(56) References Cited

U.S. PATENT DOCUMENTS

| | | | |
|---|---|---|---|
| 5,923,756 | A | 7/1999 | Shambroom |
| 6,081,900 | A | 6/2000 | Subramaniam et al. |
| 6,205,482 | B1 | 3/2001 | Navarre et al. |

(Continued)

OTHER PUBLICATIONS

Office Action for U.S. Appl. No. 12/647,327, mailed on Dec. 30, 2011, David R. Mowers, "PassThru for Client Authentication," 14 pages.

(Continued)

*Primary Examiner* — Baotran N To
(74) *Attorney, Agent, or Firm* — Lee & Hayes, PLLC

(57) ABSTRACT

This disclosure pertains generally to client authentication. One aspect of the disclosure relates to a first server for presenting evidence to a Domain Controller (DC) of a first authentication context being submitted from a client to the first server to obtain a delegable credential, wherein the credential can be used to request a second authentication context from that client to a second server. Another aspect relates to the first server providing a pass-thru with evidence to a DC. The evidence relates to a first authentication context being submitted from a client to the first server that it obtained a delegable credential. The pass-thru is used in combination with the credential to request a second authentication context from the client to a second server.

26 Claims, 8 Drawing Sheets

(56) References Cited

U.S. PATENT DOCUMENTS

| | | | | |
|---|---|---|---|---|
| 6,367,009 | B1 | 4/2002 | Davis et al. | |
| 6,633,979 | B1 * | 10/2003 | Smeets | 713/151 |
| 6,643,701 | B1 * | 11/2003 | Aziz et al. | 709/227 |
| 6,643,774 | B1 | 11/2003 | McGarvey | |
| 7,096,352 | B2 | 8/2006 | Kang et al. | |
| 2001/0020274 | A1 * | 9/2001 | Shambroom | 713/201 |
| 2002/0150253 | A1 * | 10/2002 | Brezak et al. | 380/281 |
| 2003/0005286 | A1 | 1/2003 | McGarvey | |
| 2003/0120948 | A1 | 6/2003 | Schmidt et al. | |
| 2003/0126464 | A1 | 7/2003 | McDaniel et al. | |
| 2005/0074126 | A1 * | 4/2005 | Stanko | 380/279 |

OTHER PUBLICATIONS

Non-Final Office Action for U.S. Appl. No. 12/647,327, mailed on Jun. 28, 2011, David Mowers, “PassThru for Client Authentication,” 10 pages.

* cited by examiner

PASS-THRU FOR CLIENT AUTHENTICATION

RELATED APPLICATIONS

This application is a continuation of and claims priority to U.S. patent application Ser. No. 12/647,327, filed on Dec. 24, 2009 (Now U.S. Pat. No. 8,627,440), which is a divisional of, and claims priority to, U.S. patent application Ser. No. 10/413,799, filed on Apr. 15, 2003 (Now U.S. Pat. No. 7,644,275), both of which are incorporated by reference herein.

TECHNICAL FIELD

This disclosure relates to authentication, and more particularly to client authentication.

BACKGROUND

With increased network usage, there is a need to improve the security of communications between clients and servers in a networked setting such as the Internet. Authentication protocols, which tend to prove that a communication came from whom it was stated to have originated, provide an important aspect of security.

Certain authentication protocols provide server authentication (by which a server is authenticated to a client). Some embodiments of security systems that provide server authentication allow for the server to interface with a domain controller (DC) that can present evidence to the DC of an authentication request by using a non-delegable credential (such as a certificate). Even if such server authentication results, these non-delegable credentials are not used to authenticate another server to the same client. In networked configurations, a series of servers often are used to access desired data for the client. For example, a web server may access a Structured Query Language (SQL) database data contained in an SQL server, documents contained in a file server, or other data contained in another server. Using non-delegable credentials, each successive server has to be authenticated if it is desired to maintain channels between the client and each successively accessed server.

BRIEF DESCRIPTION OF THE DRAWINGS

Throughout the drawings, the same numbers reference like features and components.

DETAILED DESCRIPTION

Server authentication is typically applied in certain prior art network systems by which the server is authenticated to the client. This disclosure provides for client authentication for a server to "prove" to a Domain Controller (DC) 32 or other authentication authority (AA) that a particular user/client is authenticated to that server. The client authentication mechanism uses client credentials (e.g., certificates, key pairs, digital identities, etc.) through a relative secure connection such as a Secure Sockets Layer (SSL)/Transport Layer Security (TLS) connection. SSL is a security protocol that was developed by the Netscape® Communications Corporation to make certain Internet transactions more secure. TLS is a standardized security protocol as set forth in IETF RFC 2246 v1.0, entitled "The TLS Protocol" (which is hereby incorporated by reference in its entirety herein). TLS is standardized by the Transport Layer Security Working Group of the IETF (Internet Engineering Task Force), and represents the working group responsible for standardizing such transport layer protocols as SSL.

Many embodiments of the SSL security protocol and the TLS security protocol cannot interface. Although there are some slight differences between SSL.v3 and TLS.v1, these security protocols are quite similar. This disclosure refers to the security protocols inclusively as "SSL/TLS", and the combined security protocols with a handshake as "SSL/TLS handshake with pass-thru" 340.

The term "SSL/TLS" as used in this disclosure relates to any combination of the SSL security protocol and/or the TLS security protocol, or modifications of, derivatives from, or closely developed protocols from, either the SSL security protocol or the TLS security protocol. One difference between SSL and TLS is that the TLS.v1 security protocol applies the Hashed Message Authentication Code (HMAC) algorithm while the SSL.v3 security protocol applies the Message Authentication Code (MAC) algorithm. The HMAC provides an integrity check value like the MAC, but the HMAC algorithm is generally more difficult to break.

Figure 1:
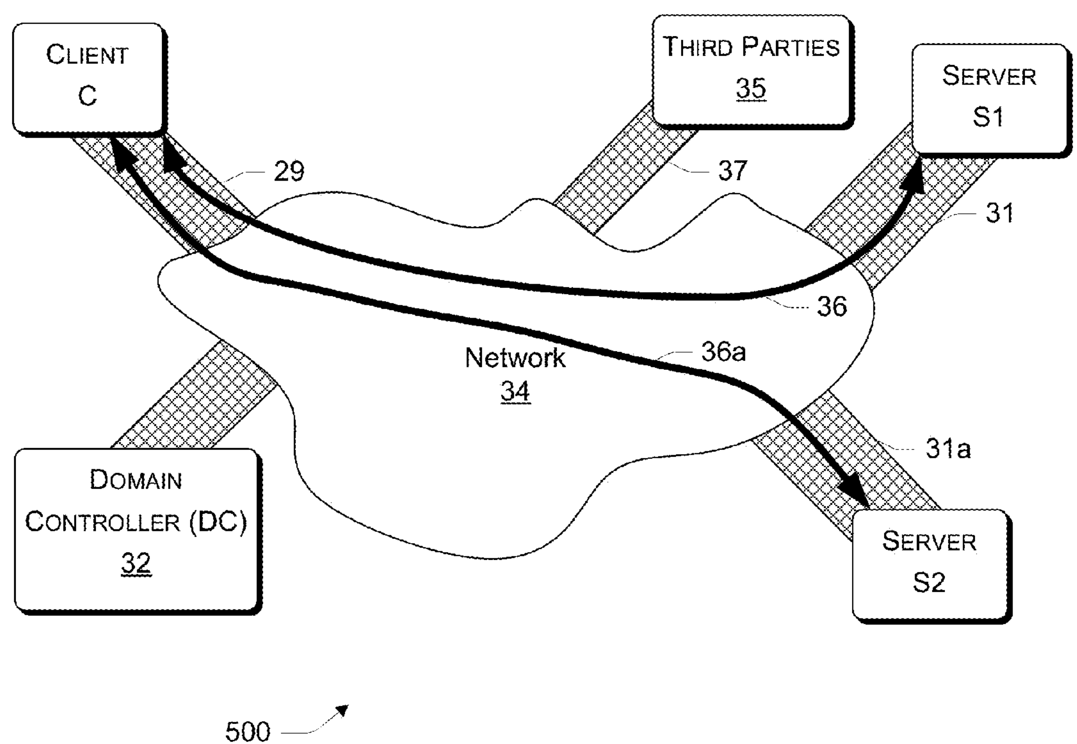
FIG. 1 illustrates a block diagram of one embodiment of a computer environment including a plurality of secure channels.

FIG. 1 illustrates one embodiment of a computer environment 500 including the client C, a first server S1, a second server S2, and the DC 32. A network 34 is provided between the client C, the server S1, the second server S2, and the DC 32 over which these devices can transfer data in a manner known in network technologies. A connection 29 connects the client C to the network 34. A connection 31 connects the server S1 to the network 34. A connection 31*a* connects the server S2 to the network 34. A third party 35 is connected to the network 34 by a connection 37. In one embodiment, the network 34 is the Internet and the server S1 is a web server. A user at the client C can thereby access data from the server S1.

The connections 29, 31, and 31*a* can represent indirect connections from the respective client C and servers S1 and S2 to the network 34. As is the case with such networks 34 as the Internet that rely predominantly on indirect connections, data transmitted between the client C and the server S1 (or data transmitted between the client C and the server S2) can be accessed by third parties 35 using known eavesdropping techniques. To reduce the possibility of eavesdropping by undesired third parties, a secure channel 36 is established between the client C and the server S1. Similarly, a secure channel 36*a* is established between the client C and the server S2.

Data transmitted between the client C and the server S1 can travel on the secure channel 36. Data transmitted between the client C and the second server S2 can travel on the secure channel 36*a*. The secure channel 36 is established using server credentials such as a certificate. In certain embodiments, the credential is delegable. In those embodiments that the credential is delegable (such as is the case with Basic authentication for example), then another secure channel could be established between S1 and S2. SSL/TLS does not rely on the client authentication credential for establishment of the secure channel. The secure channel can be provided based on the server credential (or no credential at all in the case of an anonymous DH).

This disclosure is largely directed to authentication and, more particularly, client authentication to servers (in addition to server authentication to clients). In this disclosure, authentication provides proof to a receiving device or a user that data received from the supposed source actually originated from that source. The SSL/TLS handshake with pass-thru 340 of this disclosure provides a mechanism (that relies on an SSL/TLS handshake as described herein) by which securely transmitted data can be authenticated. The data transmitted over a secure channel can be encrypted to transmit the signal over the channel, and then decrypted after is has been transmitted over the channel. Decryption is the inverse operation of encryption. Symmetric and asymmetric algorithms are both relied on to provide such encryption and decryption.

Cryptography, which the SSL/TLS handshake with pass-thru 340 utilizes for its security, is heavily processor intensive. As such, if certain types of cryptography is applied to such networks as the Internet, the Website's performance may be diminished. Although the SSL/TLS handshake with pass-thru 340 is relatively efficient and resourceful, the SSL/TLS protocol (as with any protocol) is only as fast as the encryption rate which, in turn, is influenced by the processor speed of the computer.

A Secure Channel (SChanel, one embodiment produced and distributed by Microsoft) as applied within this disclosure is a protocol suite that includes a plurality of industry standard protocols. In this disclosure, the term "secure channel" refers to a channel that has an adequate security level considering current encryption and authentication techniques (e.g., sufficient from the viewpoint of the designer of software running on the client and/or server). One embodiment of the protocols included in SChannel includes Transport Layer Security (TLS) version 1.0, Secure Sockets Layer (SSL) version 3.0, Secure Sockets Layer (SSL) version 2.0, and Private Communication Technology (PCT) 1.0.

Certain embodiments of SChannels can provide authentication through mapping of credentials (e.g., certificates). If a server authenticates a client computer C, the user at that client computer can be provided an option of certain mapping aspects of the client's credentials into the Windows user account. For example, this authentication mapping can be done as a 1-to-1 mapping (as shown in certain embodiments of FIG. 9) or as a many-to-1 mapping (as shown in certain embodiments of FIGS. 3 and 4). If client authentication is enabled, the server will search for, and associate, the credentials with the Windows user account. This association allows a user to manage their clients through an Active Directory.

Certain embodiments of the SSL/TLS handshake with pass-thru 340 can only protect data that is being transferred, and cannot ensure data integrity if the data is compromised on the application level. The SSL/TLS handshake with pass-thru 340 can securely deliver data from one end of a network to another end of the network in a manner that reduces the possibility of eavesdropping or data modification.

Figure 2:
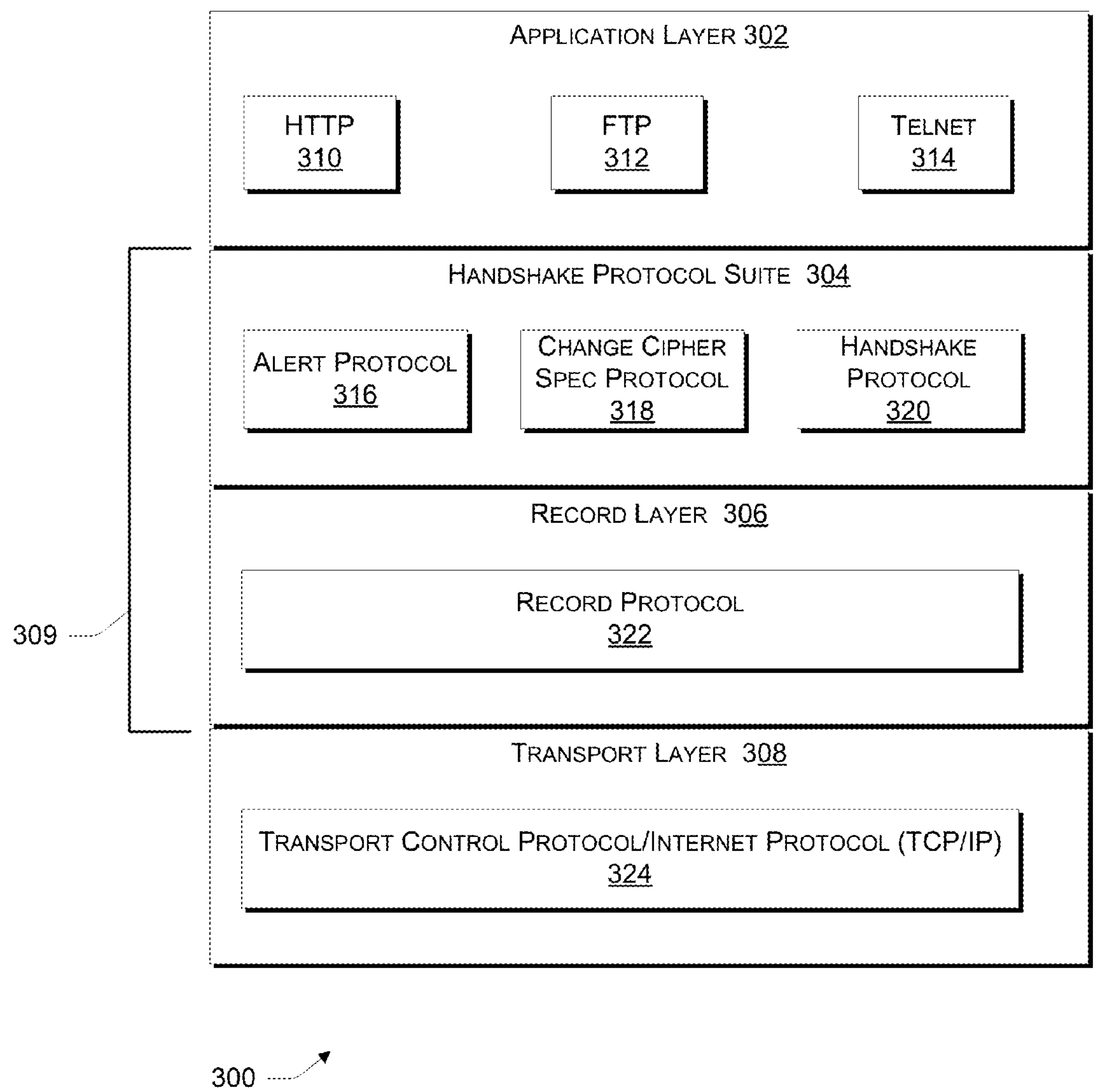
FIG. 2 illustrates a diagram of one embodiment of a security protocol.

One embodiment of the SSL/TLS handshake with pass-thru 340 can be performed within an SSL/TLS security protocol 300 as shown in FIG. 2 that includes an application layer 302, a handshake protocol suite 304, a record layer 306, and a TCP/IP transport layer 308. The handshake protocol suite 304 and the record layer 306 together are considered to be a SSL/TLS layer 309. The application layer 302 includes such illustrative programs as Hypertext Transport Protocol (HTTP) 310, File transport protocol (FTP) 312, and TELNET 314.

The handshake protocol suite 304 includes such illustrative components that provide for handshakes as an alert protocol 316, a change cipher protocol 318, and a handshake protocol 320. The record layer 306 includes, for example, a record layer protocol 322. The TCP/IP transport layer 308 includes such illustrative protocols as a transport control protocol/internet control protocol (TCP/IP) 324 which controls the transport of data across the network between the client and server computers. The SSL/TLS security protocol 300 can support any application level protocol since it works between the application layer 302 and the TCP/IP transport layer 308.

The change cipher protocol 318 is used where the client C is determining whether to go ahead with the negotiated encryption keys and hash algorithms. The change cipher protocol 318 can maintain the cipher specification using the "Change Cipher Spec:none" command, which indicates that the current or negotiated encryption method is satisfactory to the client.

One embodiment of the handshake protocol suite 304 includes a set of exchanges that provides client and server authentications. The handshake protocol suite 304 negotiates the encryption, hash, and compression algorithms. For authentication purposes, a credential (such as a certificate) provides strong evidence to a second party that a user providing the credential is the person owning (i.e., described in) the credential. The credential is a form of identification that is issued by a trusted third party such as an authentication authority (AA), one embodiment of which is a certificate authority (CA). The credential typically includes information describing the name of the user, the validity period of the credential, the user's public key, a serial number, and a digital signature issued by the issuer.

A credential issued by an authentication authority (AA) can be used to verify the identity of a particular user. The AA is a mutually trusted third party that confirms the identity of a requestor of a credential, then issues to the requestor the credential binding their identity to a public key. AA's also renew and revoke credentials as necessary. For example, if the client is presented with the server's credentials, then the client computer will try to match the server's AA against the client's credential store that includes a listing of all trusted AAs. If the issuing AA is a trusted AA, then the client will accept the credential as proof of identity of the second party.

Public key encryption relies on a key pair including a private key and a public key. The private key can be used to sign a message (including data) that is sent from a first user/computer to a second user/computer, wherein that message is validated by the public key at the second user/computer. The public key can be used to encrypt a message (including data) that is sent from the second user/computer to the first user/computer, wherein that message is decrypted by the private key.

The SSL/TLS handshake with pass-thru 340 provides a mechanism with strong authentication, message privacy, and integrity. The SSL/TLS handshake with pass-thru 340 provides the ability to secure transmitted data using encryption as well as a data integrity check (using, for example, a Hashed Message Authentication Code [HMAC]). Attacks that can be directed against the SSL/TLS handshake with pass-thru 340 include masquerade attacks, man-in-the-middle attacks, roll-back attacks, and replay attacks.

The SSL/TLS handshake with pass-thru 340 usually offers server authentication and often client authentication, as described herein. The disclosure provides a flow chart of certain embodiments of the SSL/TLS handshake with pass-thru 340 in FIG. 5 that provide both server authentication and client authentication.

The different embodiments of the SSL/TLS handshake with pass-thru 340 can work with most browsers including (but not limited to) Microsoft® Internet Explorer® and Netscape® Navigator®. The SSL/TLS handshake with pass-thru 340 will work on most operating systems including (but not limited to) Microsoft Windows®, Unix, Novell®, Netscape Enterprise Server®, Oracle®, and Sun Solaris®. Certain embodiments of the SSL/TLS handshake with pass-thru 340 also provide a choice of authentication mechanisms, encryption algorithms, and hashing algorithms. The SSL/TLS handshake with pass-thru 340 is largely application program protocol independent.

Since the client authentication (as represented by a SSL/TLS handshake with pass-thru 340 as will subsequently be described relative to FIG. 5) is layered beneath the application layer, most of its workings are completely invisible to the client. The SSL/TLS handshake with pass-thru 340 encrypts confidential data sent over an insecure connection such as the Internet. The types of data encrypted with the SSL/TLS handshake with pass-thru 340 include, for example, the Universal Resource Locator (URL), the Hypertext Transfer Protocol (HTTP) header, cookies, and form content. A web page secured with an SSL/TLS handshake with pass-thru 340 will typically have a URL which begins with the recognized address "https://".

One aspect of this disclosure relates to server S1 proving to an authentication authority that it authenticated. Transmitted credentials (such as a certificate) that provide the authentication of a particular server S1 to the particular client C (or vice versa) is described in this disclosure as an authentication context. Because current authentication contexts apply only to a single local server, known prior art authentication systems do not allow for a second local server S2 to receive a request from the first server S1 to confirm that the user was appropriately authenticated by that first server S1.

The present disclosure provides for an authentication context mechanism that allows the second server S2 to confirm that a user at a client C was appropriately authenticated by the first server S1, once it receives the appropriate authentication from server S1.

This disclosure also describes certain embodiments of the delegation of authentication contexts. A pass-thru mechanism is often provided to allow for a delegation of authentication contexts. When a security authentication context is delegated, a particular client authentication for a client C to a first server S1 is delegated to another client authentication from the same client C to a second server S2 as shown in FIG. 1. Certain prior art authentication contexts are not delegated because the authentication context is only used locally for a specified user/client pair to a specified server.

Figure 3:
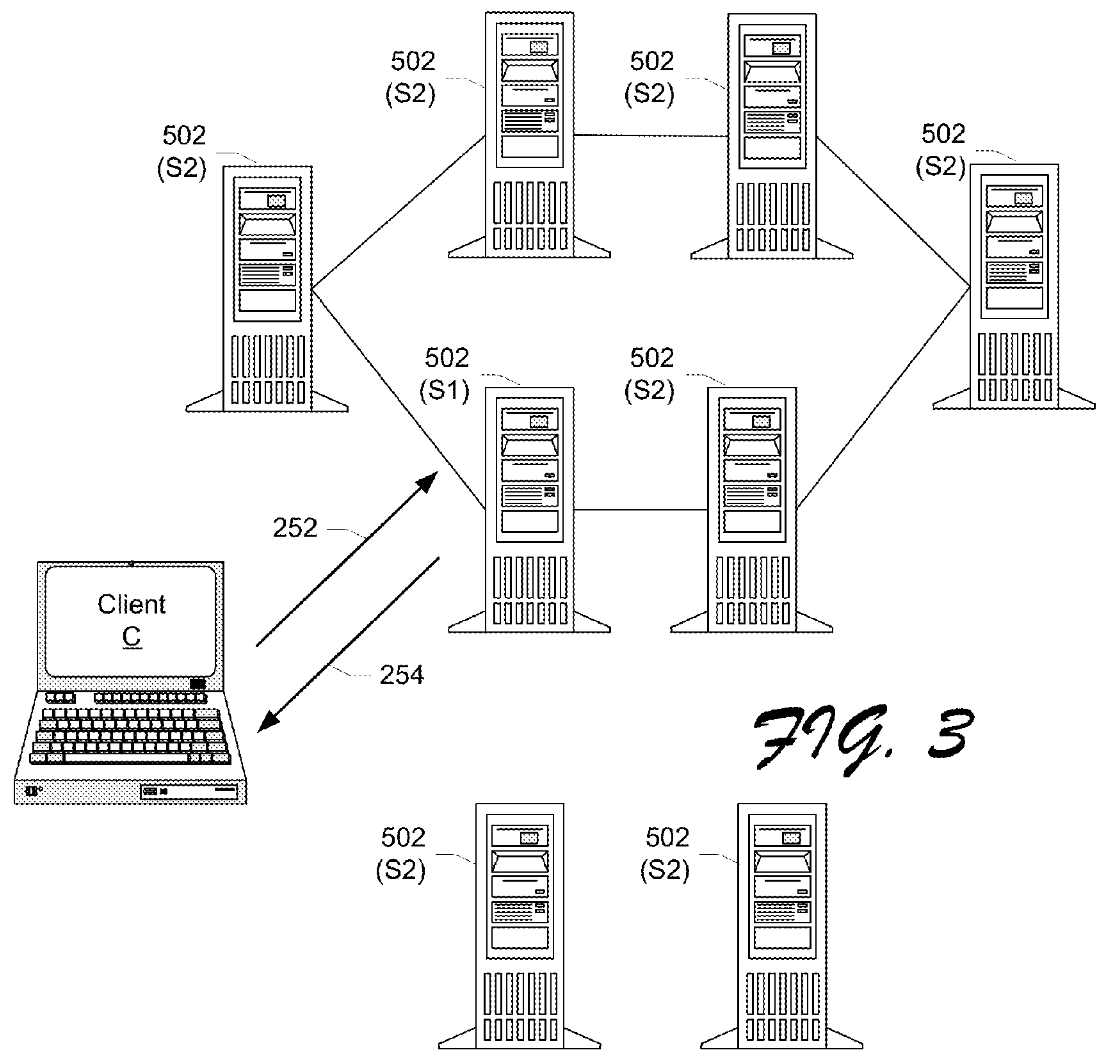
FIG. 3 illustrates a block diagram of one embodiment of a client-server configuration in a computer environment.
Figure 4:
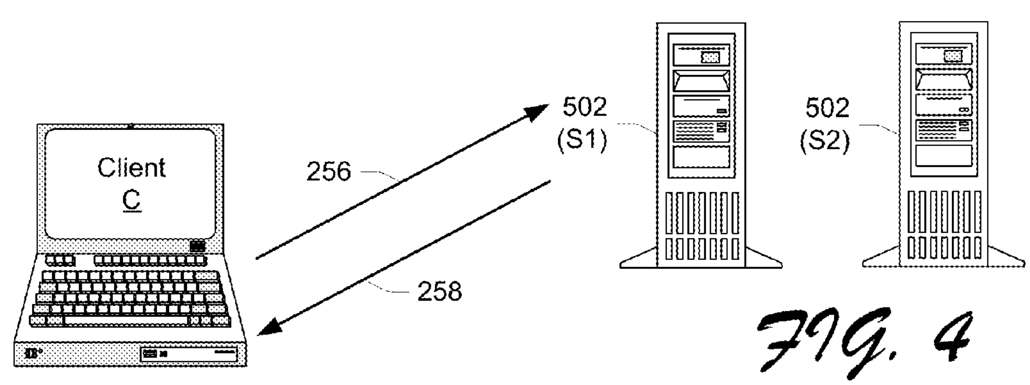
FIG. 4 illustrates a block diagram of another embodiment of a client-server configuration in a computer environment.

Providing a pass-thru mechanism for the delegation of client C authentication contexts from server S1 to the second server S2 has a variety of applications. For example, assume that a user at a given client computer C is signing on with first server computer S1 over a network wherein client authentication (as well as server authentication) is to be provided to establish a secure channel. In Internet embodiments, the first server S1 is likely to be a web server. In networked embodiments including the Internet (such as shown in FIGS. 3 and 4) the first server S1 is likely to be a network server, etc. in this disclosure, the term "first server" S1 is considered that server being accessed prior to other servers (such as a second server S2). Often, a series of servers must be accessed during a given search or query over the network because no one server has all of the data required. In FIG. 3, a plurality of computers 502 are configured as servers S1 and S2. Each server S1 and S2 is arranged in a ring configuration, such as provided by the token ring network algorithm. In FIG. 4, a plurality of computers 502 are configured as servers S1 and S2. Each server S1 and S2 is arranged in a networked configuration, such as provided by a variety of network algorithms. As indicated by FIGS. 3 and 4, the concepts and arrangements of the servers S1 and S2 of the present disclosure can be applied to any one of the known variety of network protocols and network configurations.

Subsequent networked servers S2 (from the first network server S1) that are accessed to provide additional data requested by the user are often referred to as "back-end servers". In one embodiment of a network, the back-end server S2 may include an SQL database server, a file server, an image server, or the like that contains the data that is being sought by the user as he/she accesses the first server S1. As such, the first server, or front-end server S1, is often not the final destination for a user/client C of the Internet or network.

One embodiment of the authentication context is associated with a particular authentication ticket (e.g., a Kerberos ticket). Each authentication ticket is associated with the authentication between a particular client and a particular server. As such, this disclosure provides a pass-thru mechanism by which distinct authentication tickets T1, T2 from a client C (see FIG. 7) are generated for each server S1 and S2 of a set of servers. For greatly improved security, it is important that each server that receives a delegated authentication context should be assured that the outward facing server actually authenticated the client.

The establishing of secure channels 36 and 36*a* in the computer environment 500 shown in FIG. 1 is provided by encryption and decryption, and is done in a manner that provides both client authentication and server authentication, as described herein. Data is encrypted at the particular server S1 or S2 or at the client C that transmits the data. Data is decrypted at the particular server S1 or S2 or the client C that receives the data. One embodiment of the encryption/decryption algorithm is a public key authentication program that relies on key pairs formed from long strings of data. One embodiment of the public key authentication program includes the RSA algorithm. Each key pair includes a public key and a private key "owned" by a particular user. The public key of a key pair can be used to decrypt data that is encrypted using the corresponding private key. Similarly, the private key of a key pair can be used to decrypt data that is encrypted using the corresponding public key. Data integrity and confidentiality are provided by using a session key established as shown in FIG. 5.

Figure 5:
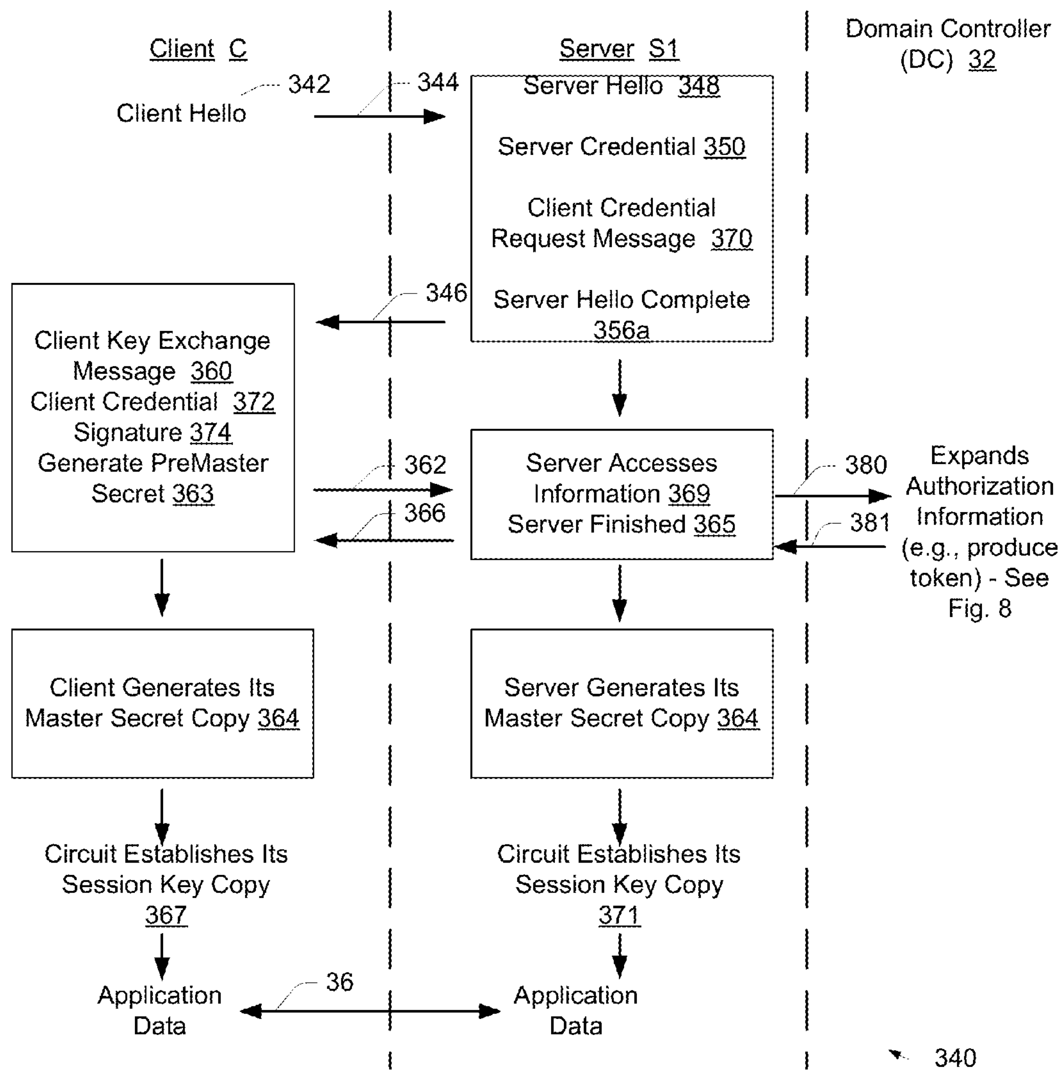
FIG. 5 illustrates a signal diagram of one embodiment of a handshake between a client and a server including client authentication.

The embodiment of the SSL/TLS handshake with pass-thru as shown in FIG. 5 provides for delegable authentication contexts. As such, a client authentication for a particular client can be transferred from a first server to another server. Client messages relating to credentials (e.g., digital credentials) received during a SSL/TLS handshake are forwarded to a centralized authentication authority and are cryptographically verified by the server S1. The authentication provided by the SSL/TLS handshake with pass-thru 340 can then be used as a basis for secure delegation of the user credentials across multiple servers S1 and S2. Certain embodiments of the SSL/TLS handshake process can be sequentially repeated to provide client and server authentication from a client C for as many servers S1, S2, . . . , Sn (Sn not shown) as desired using a authentication pass-thru mechanism.

A credential can be used to verify the identity of a user. Since the credential is issued by a trusted third party (the AA) to the credential requestor, the credential identifies the credential requestor depending on the proper security procedures by the trusted third party. One embodiment of the SSL/TLS security protocol 300 relies on a public key algorithm such as the RSA algorithm. Following this confirmation, the AA issues to the credential requestor the credential that binds the identity of the credential requestor to the public key. AA's are also capable of renewing and revoking credentials to multiple users as necessary. For instance, if the client is presented with the server's credential, then the client computer will attempt to match the server's AA against a listing of all the trusted AA's in the client's credential store. If the issuing AA is a trusted AA, then the client will accept the credential as proof of identity of the second party. In another embodiment of encryption technique using keys, the Diffie-Hellman key agreement may be considered an anonymous agreement between two users/computers. Symmetric encryption represents yet another encryption technique using keys in which both the sender and the receiver of encrypted messages have to agree prior to the message exchange(s) upon a single symmetric key that is identical to both sides.

In one aspect, client messages received during a SSL/TLS handshake are forwarded to a centralized authentication authority. The client messages, including the client credential message, can be cryptographically verified by the centralized authentication authority to prove that the server S1 actually authenticated the client. The authentication provided by the SSL/TLS handshake with pass-thru 340 can then be used as a basis for secure delegation of the user credentials across multiple servers.

To enable secure delegation of the SSL/TLS client authentication security contexts, it is preferable that the DC 32 validates whether the server asking for the delegated credentials actually has done an SSL/TLS negotiation with the client in question. In certain embodiments of the present disclosure, the SSL/TLS client credential validation happens only on the server box, the server only passes sufficient information to the DC 32 for client mapping to identify the user—not prove that the client authenticated to the server. One approach is described below for how to positively establish that the client in question did authenticate the server. This proof can be established using public key signature checks and not requiring a computationally expensive private-key decryption.

Certain embodiments of the SSL/TLS handshake with pass-thru 340 use a combination of asymmetric encryption and symmetric encryption. Symmetric encryption is faster than asymmetric encryption, but asymmetric encryption generally provides improved authentication largely because the keys used with asymmetric encryption are larger than those used with symmetric encryption.

The SSL/TLS sessions include an exchange of messages. The security of the SSL/TLS sessions is based largely on the SSL/TLS handshake that allows the server to authenticate itself to the client (or vice versa) prior to transmitting bulk data between the client and the server. Many embodiments of the SSL/TLS handshake are based on asymmetric encryption. Following the SSL/TLS handshake, in many embodiments, the client and the server use symmetric keys to transmit encrypted data.

Certain details of certain embodiments of the SSL/TLS handshake with pass-thru 340 are now described relative to FIG. 5. One embodiment of the SSL/TLS handshake with pass-thru 340 provides sufficient client authentication to permit an exchange of credentials between one server S1 with the client C and a second server S2 (the server S2 is not shown in FIG. 5) with the client C. The credentials in the SSL/TLS handshake with pass-thru 340 are only provided by the server since the client has no certificate-based credentials to use as part of the SSL/TLS handshake with pass-thru 340.

The embodiment of SSL/TLS handshake with pass-thru 340 shown in FIG. 5 includes the client C initially sending a client hello 342 via a client hello communication 344 to the server S1. The server S1 responds to the client hello 342 by generating a server hello 348, a server credential (e.g., server certificate) 350, a client credential request message 370, and a server hello complete **356*a*. The server credential 350 contains a variety of information such as who issued the credential, the subject of the credential, the credential chains including chains through one or more subordinate certificate authorities up to some trusted root (e.g., a trusted certificate authority), and the public key of the public-private key pair (e.g., in the RSA algorithm). The server S1 transmits the server hello 348, the client credential request message 370, and the server hello complete 356*a* to the client C in a server hello communication 346**.

The server hello 348 of the embodiment of the SSL/TLS handshake with pass-thru 340 shown in FIG. 5 includes a client credential request message 370 that is transmitted over the server hello communication 346 to the client C. The client credential request message 370 can contain additional information including which trusted root (e.g., AA) the server can link to. This is worth noting because server S1 and client C use at least one of the same trusted roots to establish a credential chain between the client and the server for credential verification.

If server S1 specifies the client credential request message 370, the client will respond by providing a client credential 372 as shown in FIG. 5. The client C transmits a signature 374 in addition to the client credential 372 over the client key_exchange_message communication 362 to the server S1 (as a digitally signed structure that is hashed and concatenated). The signature 374 is generated using the private key that is contained on the client credential 372 (which can be validated by the public key included with the client credential). In response, the server S1 returns the response 366.

The client C generates a client key exchange message 360, the client credential 372, the signature 374, and a premaster secret 363. The client key exchange message 360 is an encrypted random number generated (using the public key of the server's key pair) in response to information included within the client hello communication 344 and the server hello communication 346. One embodiment of the client key exchange message 360 includes a first randomly generated number based on the client's date and time plus a second randomly generated number which (with the public key of the server's key pair) will be ultimately used to generate a premaster secret 363.

Distinct copies of the master secret 364 and 368 are generated separately for the respective client C and the server S1 based (for each copy) on the premaster secret 363, the server hello 348, and the client hello 342. The server S1 decrypts the data in the client key exchange message communication 362, and extracts the client key exchange message value 360 and the premaster secret 363. As such, data containing the premaster secret 363 is transmitted to the server S1 as a portion of the client key exchange message communication 362.

Copies of the master secret are generated at both the client and the server using the two copies of each one of the premaster secret 363, the server hello 348, and the client hello 342. The client key exchange message 360 is transmitted via a client key exchange message communication 362 to the server S1.

In response to the client key_exchange_message communication 362, the server S1 generates the premaster secret 363 and a server finished data 365. The server S1 transmits a server finished response 366 to the client C which includes the server finished data 365, which proves to the client C that the server S1 actually possesses the private key portion of the public-private key pair (corresponding to the server credential 350). The response 366 therefore proves that the server S1 is capable of encrypting or decrypting data associated with further transmissions from the client.

The server S1 will thereupon utilize the data obtained from the client hello 342, the server hello 348, and the premaster secret 363 to generate its copy of the master secret 368. The client C will generate its copy of the master secret 364 using the client hello 342, the server hello 348, and the premaster secret 363. Both the client C and the server S1 thereby generate separately the master secret 364.

The respective copies of the master secret 364 and 368 that are generated respectively at the client C and the server S1 are used, in turn, to generate respective copies of the session keys 367 and 371 respectively at the client C and the server S1. The copies of the session keys 367 and 371 are located at the respective client C and server S1 to provide encrypted communications between the client C and the server S1. Session keys 367 and 371 generated by the respective client C and server S1 are used to encrypt bulk communications between the client C and the server S1 over the secure channel 36 illustrated in FIGS. 1 and 5.

In one embodiment, the session keys 367 and 371 provide for symmetric encryption between the client and the server S1. In symmetric encryption the same key is used to encrypt and decrypt the message. Session keys are typically symmetric keys. The SSL/TLS handshake uses public key encryption to encrypt the master secret from which the secret key is derived. The session key is used because public-private key encryption is not well-suited for exchanges of large amounts of data due to its high CPU usage. In many embodiments, the session key is short-lived and is not likely to be cracked during its relatively brief life span. Short-lived is a subjective term. Session keys are typically shorter-lived then the public/private keys. Essentially, the lifetime of the session key represents the duration of the SSL/TLS session (which could be minutes or months). The SSL/TLS handshake with pass-thru 340 thereby provides for authentication between the client C and the server S1 as well as authentication between the client C and the server S2 as described herein.

In one embodiment, the secure channel 36 is established by encrypting and decrypting the messages transmitted over the secure channel with such public key encryption algorithms as RSA, in addition to the symmetric encryption. The embodiment of the SSL/TLS handshake with pass-thru 340 described relative to FIG. 5 provides server authentication. As such, based on the SSL/TLS handshake with pass-thru 340, the server S1 can trust the AA that granted the server's credential 350.

The portions of the embodiment of the SSL/TLS handshake with pass-thru 340 described above provide server authentication. The SSL/TLS handshake with pass-thru 340 also provides client authentication in which the client encrypts some random data with the client's private key (that is, it creates a digital signature). The public key in the client's credential can correctly validate the digital signature only if the corresponding private key was used. Otherwise, the server cannot validate the digital signature and the session is terminated.

Figure 6:
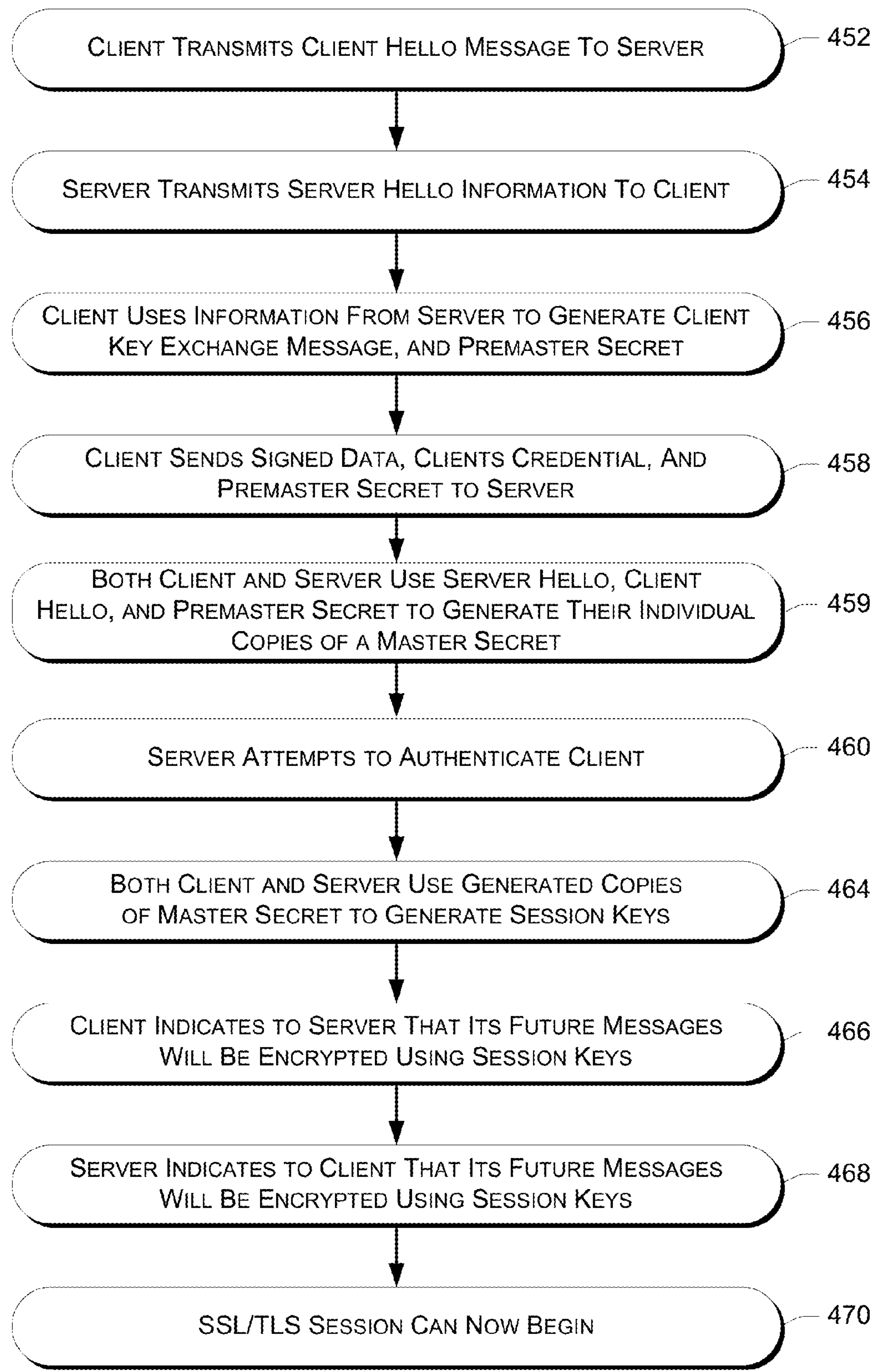
FIG. 6 illustrates a flow chart of one embodiment of a handshake including client authentication.

FIG. 6 illustrates one embodiment of flow chart associated with the SSL/TLS handshake with pass-thru 340 such as described relative to FIG. 5. It is noted that many of the details of the SSL/TLS handshake with pass-thru 340 provided in FIG. 5 is not described in the flow chart of FIG. 6. The embodiment of the SSL/TLS handshake with pass-thru 340 shown in FIG. 6 provides certain functionality to provide client authentication. In 452 the Client C transmits the client hello message (342 in FIG. 5) to the server. The client hello message includes information including the client's SSL/TLS version number, the cipher settings, and randomly generated data the server needs to communicate with the client using the SSL/TLS protocol. Typically, the randomly generated data is relatively long.

One embodiment of the client hello message contains a cipher suite (or a plurality of cipher suites) and the client key exchange message. An example of a cipher suite is TLS_RSA_EXPORT_WITH_RC2_CBC_40_MD5 (where "TLS" is the protocol version, the "RSA_EXPORT" algorithm will be used for the key exchange, the "RC2_CBC_40" represents the selected encryption algorithm and the "MD5" represents the hash function). A session identification can be included to give clients an opportunity to resume an old session.

The Hash Algorithms include a Message Authentication code (MAC) that is an integrity check value. A mapping function is used to represent the message data as a fixed-length, preferably smaller, value and then hashed. This ensures the data has not been modified during transmission. The difference between a MAC and a digital signature is that a digital signature is also an authentication method. The Keyed-Hashed Message Authentication Code (HMAC) is similar to the MAC but HMAC uses a hash algorithm in combination with a secret shared key.

In 454 of FIG. 6, the server S1 as shown in FIG. 5 transmits the server hello to the client. The server hello includes the server's SSL/TLS version number, the cipher settings, and randomly generated data that the client needs to communicate with the server. The server also sends a client credential and, if the client is requesting a server resource that requires client authentication, requests the client's credential.

The client C uses some of the information it received from the server (including the server hello) to authenticate server S1 in 456 of FIG. 6. Using certain handshake information obtained from the SSL/TLS handshake, the client (with the cooperation of the server) creates and generates the premaster secret 363 and the client key exchange message 360 as shown in FIG. 5, and encrypts the client key exchange message with the server's public key (obtained from the server's credential).

The client C transmits the encrypted premaster secret, the signed data, and the client key exchange message to the server in the transmission of 458. If the server has requested client authentication, the client also signs another piece of data that is unique to this handshake in 458. In this case the client sends both the signed data and the client's own credential to the server along with the encrypted premaster secret. The server responds by sending a separate message to the client indicating that the server portion of the handshake is finished.

In 459, both the client C and the server S1 use their respective copies of the server hello, the client hello, and the premaster secret to generate their respective copies of the master secret 364 and 368.

In 460, the server attempts to authenticate the client to provide client authentication. If the server has requested client authentication, the server attempts to authenticate the client in 460 using the credential. If the client cannot be authenticated, the session is terminated. If the client can be successfully authenticated, the server uses its cryptography (i.e., private) key to decrypt the premaster secret, then performs a series of steps on the decrypted premaster secret to generate the master secret. In 464, both the client and the server use their respective copies of the master secret 364 and 368 to generate their respective copies of the session keys 367, 371 as shown in FIG. 5. Session keys 367 and 371 are symmetric keys that are used to encrypt and decrypt information exchanged during the SSL/TLS session between the client and the server S1. The session keys 367 and 371 verify the integrity of the communications by detecting any change in the data between the time it was sent and the time it is received over the SSL/TLS connection.

In 466, the client C sends a message to the server S1 informing it that future messages from the client will be encrypted using their copies of the session key 367, 371. This represents the commencement of bulk encrypted transfer of data between the client C and the server S1. The SSL/TLS handshake can now be considered complete. An SSL/TLS session can now begin as shown in 470. The client and the server each use the session keys to encrypt and decrypt the data they send to each other. The session keys also validate the communications between the client and the server.

Before continuing with the session, servers can be configured to check that the client's credential is presently included in the user's entry (e.g., within a Lightweight Directory Access Protocol (LDAP) directory). This configuration option provides one mechanism to ensure that the client's credential has not been revoked. Both the client authentication and the server authentication involve encrypting data with one key of a public-private key pair and decrypting it with the other key of the public-private key pair.

Consider that (based on encryption concepts) only the corresponding private key can correctly decrypt the premaster secret. As such, the client is provided considerable assurance that the server is associated with the public key if the client can encrypt the premaster secret. If the server cannot decrypt the premaster secret (and therefore cannot generate the symmetric keys required for the session) then the session will be terminated. The SSL/TLS-enabled client C provides server authentication, or cryptographic validation by a client of the server's identity.

To provide client authentication, the server S1 sends the client C its server credential to authenticate itself as described relative to FIGS. 5, 6, 7, and 8. The client uses its server credential to authenticate the identity of the server. In one embodiment, to authenticate the binding between a public key and the server identified by the credential that contains the public key, a SSL/TLS-enabled client must receive an affirmative answer to multiple questions that provide one embodiment of a client's authentication process.

An SSL/TLS enabled client C goes through the following considerations to authenticate a server's identity. The client C determines whether the date of the computer is within the validity period of the credential. The client C checks the server credential's validity period. If the current date and time of the client C are outside of the range listed on the credential, the authentication process won't go any further. If the current date and time are within the credential's validity period, the client's authentication process continues.

The client C following its client's authentication process next considers whether the issuing AA is a trusted AA. Each SSL/TLS enabled client C maintains a list of trusted AA credentials. This list of trusted AA credentials determines which server credentials the client will accept. If the distinguished name (DN) of the issuing AA matches the DN of an AA on the client's list of trusted AAs, then the client's authentication process continues. If the issuing AA is not on the list of trusted AA credentials, the server will not be authenticated and the client's authentication process continues.

The client's authentication process next considers whether the issuing AA's public key validates the issuer's digital signature. The client C uses the public key from the AA's credential (which it found in its list of trusted AAs) to validate the AA's digital signature on the server credential being presented. If the information in the server credential has changed since it was signed by the AA, or if the AA credential's public key doesn't correspond to the private key used by the AA to sign the server credential, the client C won't authenticate the server's identity and the client's authentication process is terminated. If the AA's digital signature can be validated, the server treats the user's credential as a valid "letter of introduction" from that AA and proceeds. At this point in the client's authentication process, the client has determined that the server's credential is valid.

The client's authentication process continues to determine whether the domain name in the server's credential matches the domain name of the server itself. This step confirms that the server is actually located at the same network address specified by the domain name in the server credential. Although this process is not technically part of the SSL/TLS handshake with pass-thru 340, it provides the only protection against a form of security attack known as a Man-in-the-Middle Attack. Clients perform this step and refuse to authenticate the server or establish a connection if the domain names don't match. If the server's actual domain name matches the domain name in the server credential, the client proceeds with the SSL/TLS handshake.

After the processes described in the client's authentication process, the server must successfully use its private key to decrypt the premaster secret the client C transmits in the SSL/TLS handshake. Otherwise, the SSL/TLS session will be terminated. This provides additional assurance that the identity associated with the public key in the server's credential is in fact the server with which the client is connected.

In certain embodiments, the client C checks the server domain name specified in the server credential against the actual domain name of the server with which the client is attempting to communicate. This is necessary to protect against a man-in the middle attack, which works as follows. The "man in the middle" attack is a rogue program that intercepts all communication between the client and a server with which the client is attempting to communicate via the SSL/TLS handshake with pass-thru 340 session. The man in the middle program intercepts the legitimate keys that are passed back and forth during the SSL/TLS handshake, substitutes its own, and attempts to make it appear to the client that it is the server, and to the server that it is the client.

The encrypted information exchanged at the beginning of the SSL/TLS handshake is actually encrypted with the rogue program's public key or private key, rather than the client's or server's real keys. The "man in the middle" program establishes one set of session keys for use with the server S1, and a different set of session keys for use with the client C. This allows the "man in the middle" program not only to read all the data that flows between the client and the real server, but also to change the data without being detected. Therefore, it is important for the client C to check that the domain name in the server credential corresponds to the domain name of the server with which a client is attempting to communicate.

The SSL/TLS handshake is used in certain embodiments of pass-thru algorithms for the SSL/TLS handshake. This SSL/TLS handshake does not guarantee accuracy of the server-provided timestamp. If the user of a server so wished, it could use inaccurate timestamps for the Server.key exchange message value and create "post-dated" timestamps for use at some point in the future.

A message authentication code (MAC) includes an integrity check value. A mapping function is used to represent the message data as a fixed length value that is hashed. The MAC ensures that the data has not been modified during transmission. A Keyed-Hashed Message Authentication Code (HMAC) is similar to the Message Authentication Code (MAC), but HMAC uses the hash algorithm in combination with a second shared key.

During the Handshake protocol, the hash algorithm is also agreed upon. A hash is a one-way mapping of values to a smaller set of values, the size of the hash is smaller than the original message. Hashing is used to establish data integrity during the transport of data.

The record protocol does the actual handling of data from the application layer and delivers the data to the TCP/IP layer. The record protocol takes the data, fragments it, operationally compresses (or decompresses for received data), and then encrypts (and decrypts) the data using the information determined during the handshake protocol.

To address this, the SSL/TLS server should be modified to request a timestamp from the DC 32 using a Hashed Message Authentication Code (HMAC) code portion with a long-term key held by the DC:

nonce=HMAC (dc_key, dc_timestamp) The nonce would then be hashed with the server's key exchange message value to compute Server.key_exchange_message.random_bytes according to the following calculation:

```
Server.key_exchange_message.random_bytes=
    SHA(nonce+Server.key_exchange_
    message.random_bytes[1 . . . 20])+
    Server.key_exchange_message.random_
    bytes[21 . . . 28]
```

It is not necessary that the nonce be generated for every challenge. If the domain controller (DC) policy was set to require that handshakes be valid for a period of 10 minutes, for example, then the server would only need to request a new timestamp when the previously obtained nonce had, or was about to, expire. The Domain Controller (DC) would provide a current nonce and DC timestamp to the server upon request. The handshake protocol is a series of sequenced messages which will negotiate the security parameters of that data transfer session.

The embodiment of the SSL/TLS handshake shown in FIGS. 5 and 6 provides for client authentication. Certain embodiments of the SSL/TLS-enabled servers S1 and S2 that are performing the SSL/TLS handshake with the client C can be configured to require client authentication as described relative to FIG. 5. When a server requests client authentication, the client sends the server both a credential and a separate piece of digitally signed data to authenticate itself. The server uses the digitally signed data to validate the public key in the credential and to authenticate the identity the credential claims to represent.

One embodiment of the format of the client credential message is the same as is used for the server credential (i.e. certificate) [as indicated in RFC 2246 that describes TLS]:

```
   opaque ASN.1Cert<1..2^24-1>;
   struct
   {
ASN.1Cert
   credential_list<0..2^24-1>;
}
   Credential;
```

The client will also send the CredentialVerify message, which is the following structure signed with the private key of the client credential (e.g., certificate) as per the TLS standard (RFC 2246):

```
   Struct
   {
Signature signature; }
   CredentialVerify;
   { case anonymous: struct { };
   case rsa:
   digitally-signed struct {
   opaque md5_hash[16];
   opaque sha_hash[20];
   };
   case dsa:
   digitally-signed struct {
   opaque sha_hash[20];
   };
   } Signature;
   CredentialVerify.signature.md5_hash
MD5(handshake_messages);
   Credential.signature.sha_hash
SHA(handshake_messages);
```

In the CredentialVerify message, sent by the client C, the term "handshake_messages" refers to all handshake messages sent or received after a client hello, up to but not including this message, and including the type and length fields of the handshake messages. The client is authenticated by using its private key to encrypt the hash of all the messages transmitted up to this point. The recipient decrypts the hash algorithm using the public key of the signer, thus ensuring it was encrypted by the sender's private key, applies it to the data bits and verifies it matches the received value.

The SSL/TLS server (e.g., S1 or S2) can thereupon pass all of the handshake messages (which includes the Client Credential and CredentialVerify messages) for this connection up to the DC to establish positive proof that a client with this credential authenticated itself to this server.

During the handshake protocol, a hash algorithm that can be used is agreed upon. The hash algorithm is a one-way mapping of values to a smaller set of values. The size of a hash message is therefore smaller than the size of the original message. The SSL/TLS handshake with pass-thru 340 requires the client to create a digital signature by creating a one-way hash from data generated randomly during the handshake and known only to the client and server. The hash of the data is then encrypted with the private key that corresponds to the public key in the credential being presented to the server. To authenticate the binding between the public key and the person or other entity identified by the credential that contains the public key, an SSL/TLS enabled server must successfully complete the client authentication process as now described.

An SSL/TLS enabled server S1 (or S2) goes through the client authentication process to authenticate a particular client C. The server S1 determines whether the user's public key validates the user's digital signature. The server S1 determines whether the user's digital signature can be validated with the public key in the credential. If so, the server has established that a public key which is asserted to belong to a particular user actually matches the private key used to create the signature and the client authentication process continues. If not, then the client authentication process terminates.

The server determines whether the server's date and time is within the validity period of the client's credential. If the current date and time of the server are outside of the range of the credential's validity period, the client authentication process terminates. If the current date and time are within the credential's validity period, the server continues its client authentication process.

The server considers whether the issuing AA is a trusted AA. Each SSL/TLS enabled server maintains a list of trusted AA credentials. This list of trusted AA credentials determines which client credentials the server will accept for authentication. In one embodiment, the domain name (DN) of the issuing AA is considered. If the DN of the issuing AA matches the DN of an AA on the server's list of trusted AAs, the client authentication process continues. If the issuing AA is not on the list of trusted AA credentials, the client authentication process will terminate.

The server next considers whether the issuing AA's public key validates the issuer's digital signature. The server uses the public key from the AA's credential (which it found in its list of trusted AAs) to validate the AA's digital signature on the credential being presented. If the information in the credential has changed since it was signed by the AA, or if the public key in the AA credential doesn't correspond to the private key used by the AA to sign the credential, the server won't authenticate the user's identity. If the AA's digital signature can be validated, the server treats the user's credential as a valid "letter of introduction" from that AA and proceeds. At this point, the SSL/TLS handshake with pass-thru 340 allows the server to consider the client authenticated and proceed with the client authentication process.

The server next considers whether the authenticated client is authorized to access the requested resources. The server checks what resources the client is permitted to access according to the server's access control lists and establishes a connection with appropriate access.

In certain embodiments of the SSL/TLS handshake, public key encryption is used to transmit the information to the server and keep the information secure. One embodiment of the secure channel uses the logon to the network for the pass-thru, which provides an authenticated encrypted "pipe" between server and DC by which messages can be transmitted.

Certain aspects of this disclosure relate to authentication in more complex networked configurations such as being based on a plurality of servers (e.g., a front-end server and a back-end server). A mechanism is provided by which the pass-thru with evidence communication 380 is provided from the server S1 to the DC 32. The contents of the "evidence" included in the "pass-thru with evidence" provides evidence of the client authentication to the DC 32 as described in this disclosure. In the FIG. 5 embodiment of the SSL/TLS handshake, the client C authentication is provided by validating the client credential at the server. The validation of the client credential at the server occurs by taking the private key and signing the signature. The server S1 is going to validate the client credential, then it will extract some client credential information (using RSA encryption techniques), then the server side of the authentication package calls up to the Domain Controller (DC) 32 side of the authentication package, and determines whether the client credential maps to any account in the Active Directory.

In the FIG. 5 embodiment, the server is doing the cryptography (so the server is validating the account). The DC 32 does not provide or examine the cryptography, as such the DC 32 cannot conclude that this client really did authenticate the server. As such, the DC 32 is assuming that the server did all of the correct validations. This is desirable because the client credential message plus the signature can be examined separately from the remainder of the handshake.

The DC can verify the SSL/TLS handshake. This is accomplished in one embodiment after a successful handshake in which the server will send to the DC information including, but not necessarily limited to, the handshake messages; the nonce value used for the handshake; the dc_timestamp; and the original Server.

The DC will then return to the server the following assertions on receipt of this information as shown in Table 1:

TABLE 1

| Assertions of the SSL/TLS Handshake |
|---|
| assert(nonce = HMAC-SHA(dc_key, dc_timestamp)) |
| assert(Server. key_exchange_message.random_bytes = SHA(nonce+ Server. key_exchange_message.random bytes[1..20]) + Server. key_exchange_message.random_bytes[21..28] |
| assert( (currenttime-dc_timestamp) < timestamp_validity_period) |
| assert(Passthrough.ServerIdentity = ServerCredential.credential_list.servercert) |
| assert(credential_list = valid credential chain) |
| assert(MD5(handshake_messages) = CredentialVerify.signature.md5_hash) |
| assert(SHA(handshake_messages) = CredentialVerify.signature.md5_hash) |
| assert(CredentialVerify message properly signed) |

If all the checks associated with these assertions pass, then the Domain Controller (DC) 32 is assured that the server identified in these messages was presented with a client's credential for the purposes of authentication. The DC 32 is also assured that the authentication took place within a reasonable time interval and that the server making the request for delegate-able credentials is the same server that authenticated the client.

Figure 7:
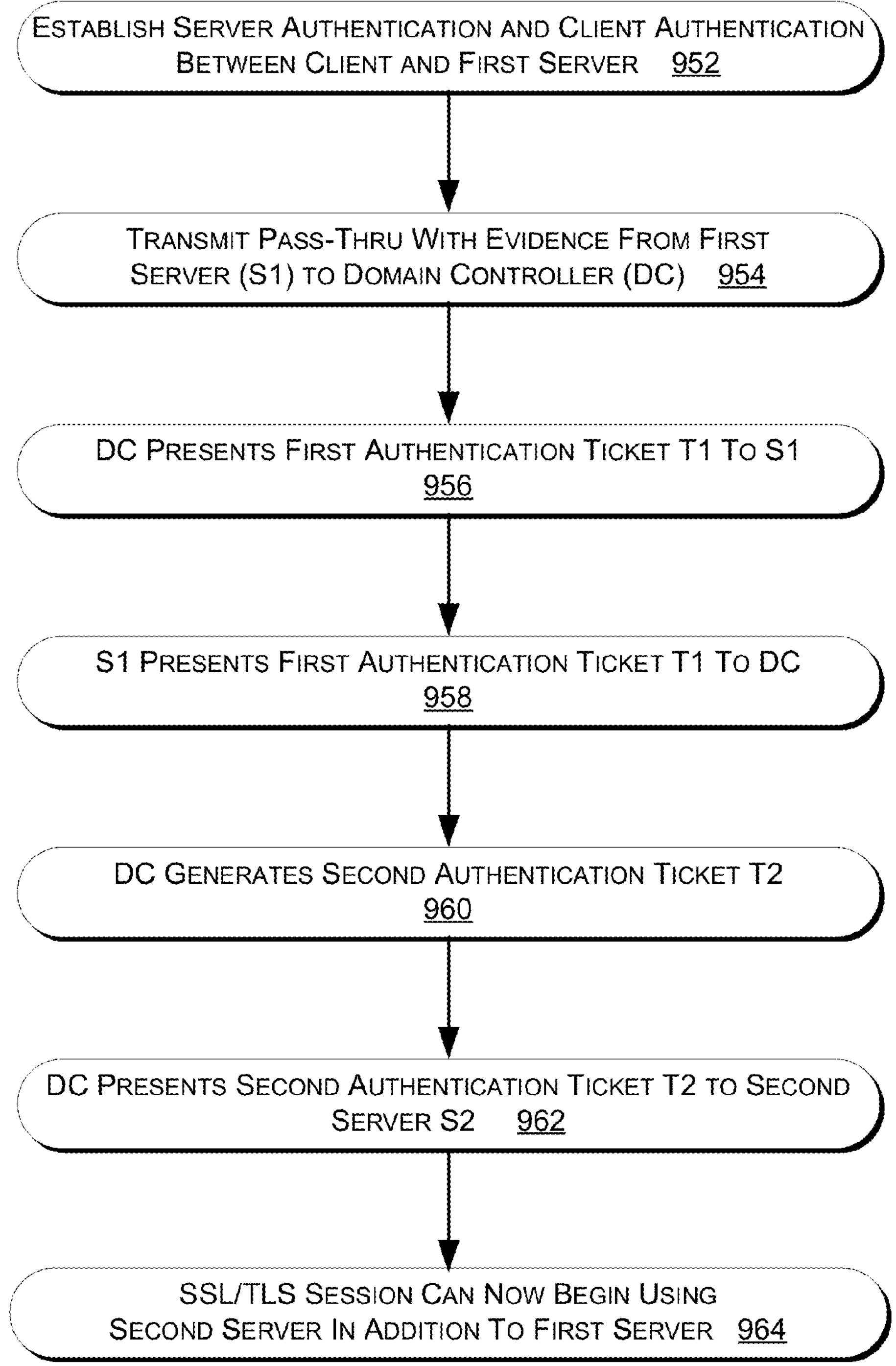
FIG. 7 illustrates a flow chart of one embodiment of a pass-thru with evidence that is used to generate a second ticket.

In one aspect, the embodiment of the SSL/TLS handshake with pass-thru 340 illustrated in FIG. 7 includes a pass-thru in which an authentication context is delegable from one server S1 to another server S2. The DC 32 is capable of generating tickets that are used for authentication. As shown in FIG. 7, a pass-thru with evidence communication 380 is transmitted from a first server S1 to the DC 32 as a request for a ticket (such as a Kerberos ticket).

The embodiment of the SSL/TLS handshake with pass-thru illustrated in procedure 950 in FIG. 7 provides for client authentication and validation at the server. The pass-thru with evidence communication 380 is based on client authentication and server authentication provided to a first server as shown in 952 in FIG. 7. The pass-thru with evidence communication 380 is transmitted to the DC 32 in 954 shown in FIG. 7. The pass-thru with evidence communication 380 is transmitted from the first server C1 to the DC 32. As a result of the Secure Channel authentication, the DC 32 validated the authentication attempt, and then returned some authorization evidence communication 381.

In response to the pass-thru with evidence, the DC 32 returns a first ticket T1 in evidence communication 381 to the first server S1 (which in certain embodiments is a Kerberos ticket). The ticket T1 is generated from the DC to the server Si in 956 of FIG. 7. In 958, the server S1 presents the first authentication ticket T1 to the DC (which is thereupon returned to the server S1).

Figure 8:
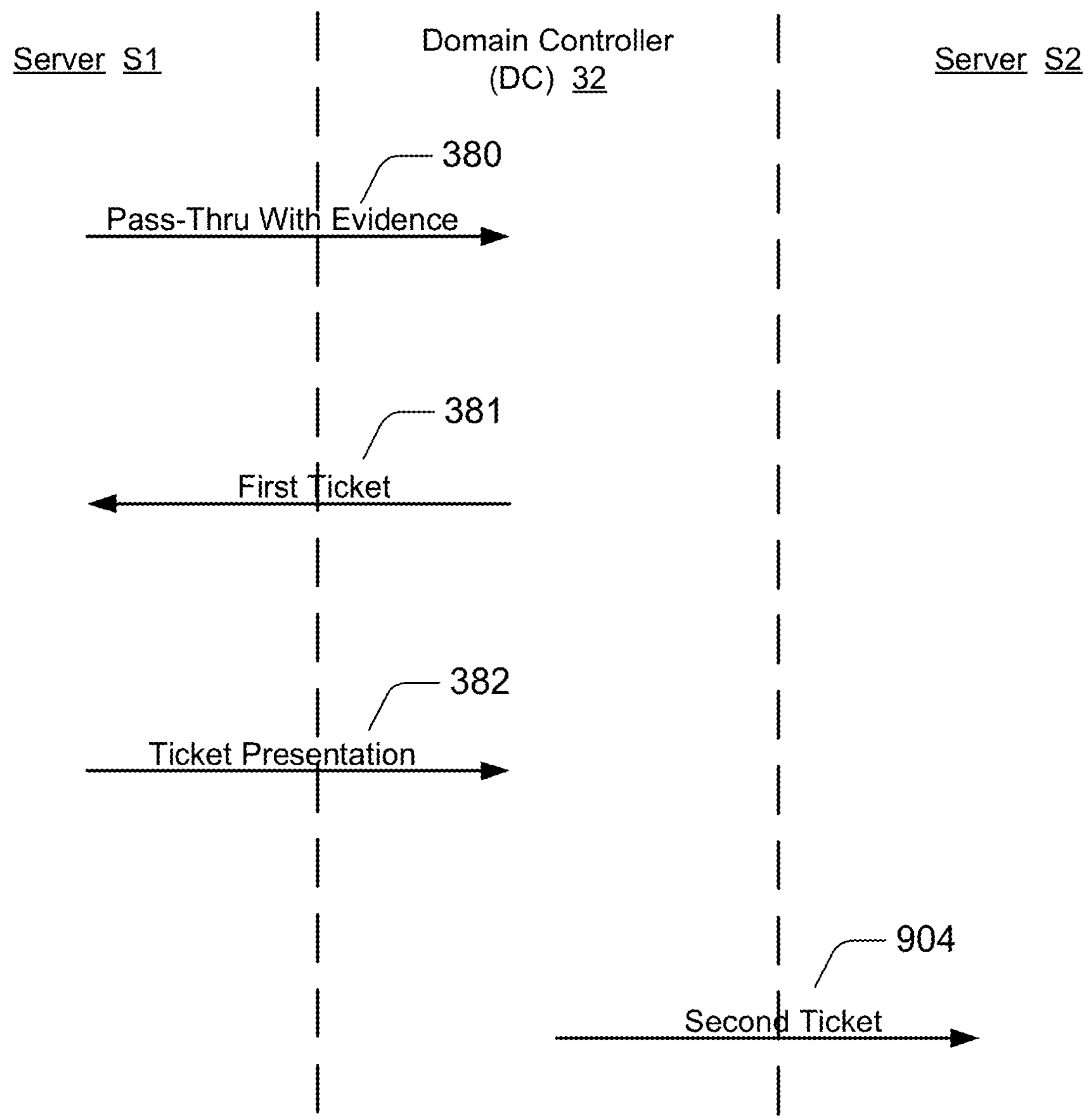
FIG. 8 illustrates a signal diagram of one embodiment of a pass-thru with evidence.

Based on the first authentication ticket T1, the DC generates a second authentication ticket T2 (which in one embodiment is also a Kerberos ticket) as shown in 960 in FIG. 7. As such, an authorization communication 382 as shown in FIG. 8 causes the second ticket T2 to be generated that expands the authorization information received over the pass-thru with information. The second authorization ticket may contain identical authentication information as the first authentication ticket T1, but be directed at a different set of parties. For instance, the first authentication ticket T1 provides authentication from the client for the first server S1. The second authentication ticket T2 provides authentication from the client C to the second server S2.

The authentication process 950 shown in FIG. 7 continues to 962 in which the DC presents the second authentication ticket T2 (904 in FIG. 8) to the second server S2. Based on the reception of the second authentication ticket T2 by the second server S2, the second server S2 has client authentication from the client C. As such, the embodiment of pass-thru with evidence communication 380 as described relative to FIGS. 7 and 8 can transfer client authentication from one server to a second server, wherein the two tickets T1 and T2 are generated to provide the client authentication to their respective servers.

One embodiment of mapping associated with the authorization information may pertain to a variety of types of information relating to the credential such as the subject name, the issuer subject identity, etc. The DC side of the package maps the credential to the account. The DC side of the package expands authorization information for the account, which then returns the information to the server.

On one embodiment of the server side, the authentication package is trusted code in the Local Security Authority (LSA). The server side of the package converts the authorization information into a security token. The security token is something produced by a trusted portion of the operating system, such as the LSA, and includes all the groups of which the user is a member. In Windows 2000 and .NET server, this security token provides adequate security for most applications. The security token is only used locally on the server. The only job the security token performs is to provide the authorization information for the client that the server believed that it authenticated.

As a result of the pass-thru with evidence communication 380 as shown in FIG. 8, the communications between the client C and the server S1 therefore will transmit to the DC 32 a ticket request message at 380 as a Kerberos pass-thru with evidence. In response to the ticket request message, the DC 32 generates and transmits a ticket T1 (such as a Kerberos ticket) at 381 to the server S1 as shown in FIG. 8. The ticket T1 can thereupon be returned to the client C for the server S1 in 382.

There are a variety of reasons why it would be desirable to provide client authentications to a plurality of servers S1 and S2. One motivation is that the server S1 can present the ticket T1 to the DC 32 as a credential in order to obtain a second ticket T2 for the client to a second back-end server 34. For instance, the server S1 would be a web server while a back-end server 34 could includes such data as a SQL database, an image server, a file server, a document server, and any such variety of data depository servers. The server S1 would "impersonate" the client C in a manner to allow the back-end server S2 could be accessed. As such, the second ticket T2 can be delegated.

With the pass-thru mechanism, evidence is now presented to the DC that authentication actually took place with this particular client to the server S1. So, for example, after the ticket T1 is obtained for the server S1, the server S1 indicates that in order to satisfy the request from the client, a query is performed against the back-end server S2. As such, the ticket T2 can be generated based on the ticket T1. The server will generate this request as the user, so the authorization decision for the back-end server is determined with the server positioned as the user. The user should be limited to accessing what the user is able to access relative to any server, particularly S2. To do this, the second ticket T2 has to be produced. When the same user/client combination obtains the second ticket T2, the same authorization information associated with the first ticket T1 is preserved relative to the second ticket T2. A different key is used to encrypt the ticket T2 from the key used to encrypt the ticket T1. With the ticket T1 for the server S1, the ticket T1 is encrypted by a key known only by the server S1 and the DC. With the ticket T2 for the server S2, the ticket T2 is encrypted by a key known only by the server S2 and the DC.

Using the pass-thru authentication with evidence, with S1, the ticket is presented for the client C to the server S1. The ticket will be processed from the Kerberos portion of the package, and will create the ticket T1. Then also, the ticket T1 will be available in case it is desired to obtain the second ticket T2 that acts as an authentication credential for the back-hand server S2 on behalf of the same client-user account. As such, multiple tickets are provided to authenticate both S1 and S2.

Through the mechanism associated with the embodiment of the SSL/TLS handshake shown in FIGS. 5, 6, 7, and/or 8, client authentication is provided. The client authentication is desired because the DC 32 is going to be issuing a ticket T1 to the server S1 for that client C. That ticket T1 can be re-presented back to the DC to allow accessing to other services, including generating another ticket T2 to authenticate another server. It is important to say that a user associated with the client C cannot obtain a ticket (such as a Kerberos ticket) unless the client actually did authenticate the server. The two tickets T1 and T2 can be used in the SSL/TLS handshake to provide the pass-thru as illustrated in FIG. 8. The second ticket T2 is used to authenticate the DC.

The evidence portion of the pass-thru authentication with evidence 380 as shown in FIGS. 7 and 8 includes the client credential and the CredentialVerify messages. The pass-thru with evidence request includes the client credential and the CredentialVerify messages, and the DC nonce. The pass-thru with evidence is presented to the DC. The DC validates the evidence by making the assertions described herein. Once the server packages up the pass-thru with evidence request, the DC is going to invoke its side of the code, and run through these sets of assertions. In the embodiment of the SSL/TLS handshake as shown in FIGS. 7 and 8, the DC performs the authentication calculations associated with the client authentication. The DC is therefore able to "verify the authentication based on the data transmitted to the server from the client, and therefore authenticates using authentication calculations based generally on "what the server saw". As such, the DC can authenticate messages for the servers S1 and S2 based on private key encrypted materials from the client. With the pass-thru, the server S2 can validate (as well as the server S1).

Certain embodiments of this disclosure describe a protocol transition from the SSL/TLS handshake with pass-thru 340 to another security protocol such as Kerberos. The reason why a series of secure channels can be maintained even with this switch in protocol includes the passing of the evidence of the original authentication of the client for an initial server through to the DC to subsequent authentication of the client with subsequent servers.

A variety of scenarios are now provided. One scenario is an authenticated client access to a secure web site. Both the client and the server need credentials from a mutually trusted AA. With such secure channels as the SChannel, client credentials can be mapped on a one-to-one or many-to-one basis and can be managed by Active Directory Users and Computers. This will be invisible to the users, and they can be authenticated to a website without the use of a password.

If a user has confidential material they would like a group of people to have access to, the user can create a group to which you can map many users' credentials and give them all the same permissions to that material. In one-to-one mapping the server has a copy of the client's credentials, and whenever the client logs in the server checks to see if they are identical. This is used for private material such as a banking site where only one individual has the right to view their personal account.

Certain Microsoft Windows® operating systems provide the option of using 128-bit encryption strength in the SSL/TLS transaction. Safe key exchanges currently range from 56-bit to 128-bit encryption, as such the user has to weigh security risks vs. performance and cost when considering the key length of the transactions. Selecting the 128-bit key encryption, for example, will slow performance but will increase security.

A firewall is a program which can exist in many different forms but basically acts like a barrier between a Local Area Network (LAN) and the outside world. The SSL/TLS handshake with pass-thru 340 will consider the computer the firewall is running on as a man-in-the-middle attack preventing the transaction from happening. To allow for the SSL/TLS traffic to go through the firewall, a port is reserved and traffic is allowed to go through unrestricted.

Figure 9:
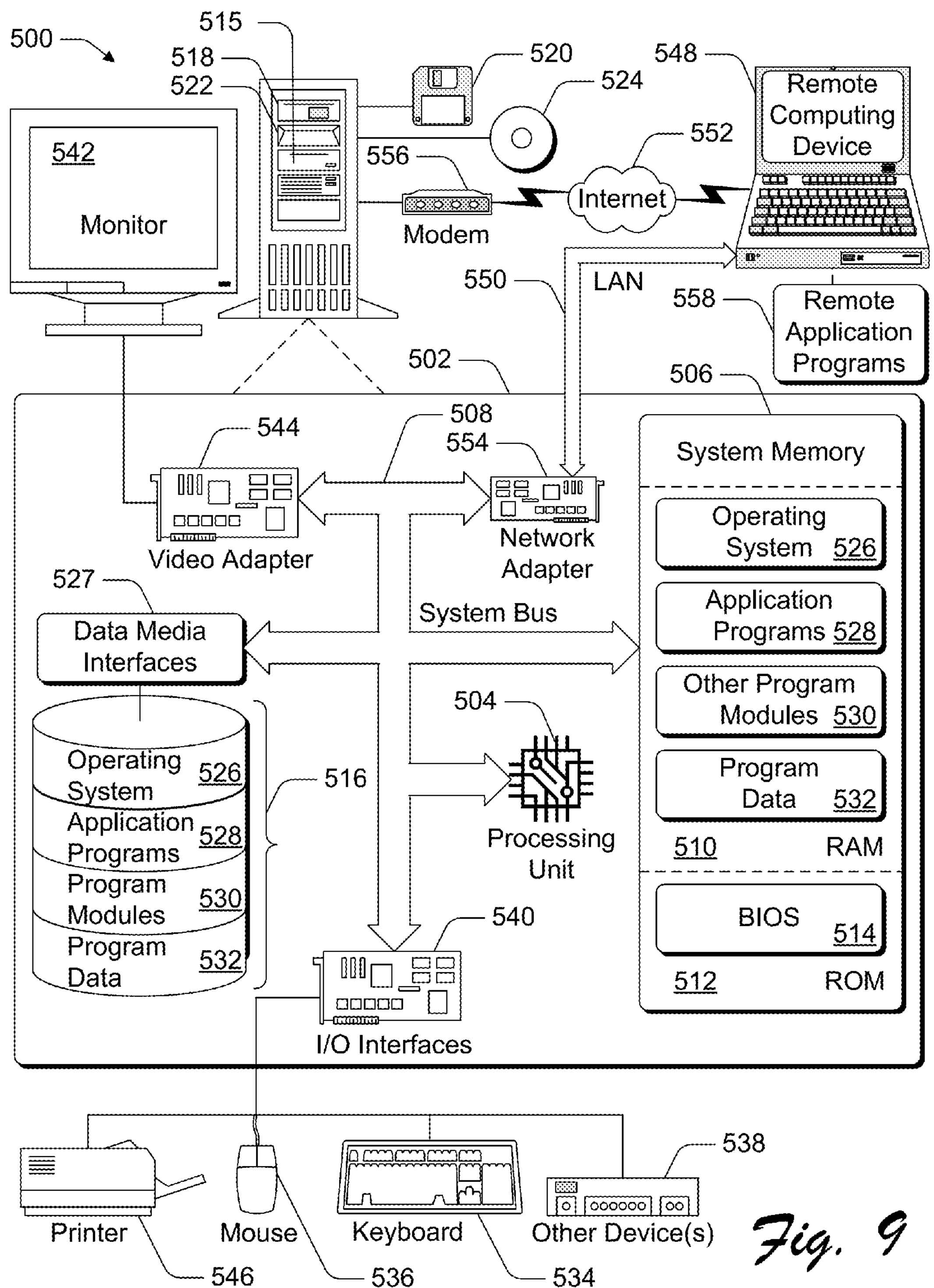
FIG. 9 illustrates a block diagram of one embodiment of a computer environment including a plurality of computers that can communicate using the security protocol.

The computer environment 100 illustrated in FIG. 9 is a general computer environment, which can be used to implement the techniques described herein for client authentication and/or server authentication. The computer environment 100 is only one example of a computer environment and is not intended to suggest any limitation as to the scope of use or functionality of the computer and network architectures. Neither should the computer environment 100 be interpreted as having any dependency relating to any one or combination of components illustrated in the exemplary computer environment 100.

The computer environment 100 includes a general-purpose computing device in the form of a computer 502. The computer 502 can be, for example, one or more of a stand alone computer, a networked computer, a mainframe computer, a PDA, a telephone, a microcomputer or microprocessor, or any other computer device that uses a processor in combination with a memory. The components of computer 502 can include, but are not limited to, one or more processors or processing units 504 (optionally including a cryptographic processor or co-processor), a system memory 506, and a system bus 508 that couples various system components including the processor 504 and the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

The computer 502 typically includes a variety of computer readable media. Such media can be any available media that is accessible by computer 502 and includes both volatile and non-volatile media, and removable and non-removable media.

The system memory 506 includes computer readable media in the form of non-volatile memory such as read only memory (ROM) 512, and/or volatile memory such as random access memory (RAM) 510. A basic input/output system (BIOS) 514, containing the basic routines that help to transfer information between elements within computer 502, such as during start-up, is stored in the ROM 512. The RAM 510 typically contains data and/or program modules that are immediately accessible to, and/or presently operated on, by the processing unit 504.

The computer 502 may also include other removable/non-removable, volatile/non-volatile computer storage media. By way of example, FIG. 9 illustrates a hard disk drive 515 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 515, magnetic disk drive 518, and optical disk drive 522 are each connected to the system bus 508 by one or more data media interfaces 527. Alternatively, the hard disk drive 515, magnetic disk drive 518, and optical disk drive 522 can be connected to the system bus 508 by one or more interfaces (not shown).

The disk drives and their associated computer readable media provide non-volatile storage of computer readable instructions, data structures, program modules, and other data for computer 502. Although the example illustrates a hard disk within the hard disk drive 515, a removable magnetic disk 520, and a non-volatile optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk contained in the hard disk drive 515, magnetic disk 520, non-volatile optical disk 524, ROM 512, and/or RAM 510, including by way of example, the OS 526, one or more application programs 528, other program modules 530, and program data 532. Each OS 526, one or more application programs 528, other program modules 530, and program data 532 (or some combination thereof) may implement all or part of the resident components that support the distributed file system.

A user can enter commands and information into the computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, game console, and the like. The remote computing device 548 is illustrated as a portable computer that can include many or all of the elements and features described herein relative to computer 502.

Logical connections between computer 502 and the remote computing device 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computer environment 100, program modules depicted relative to the computer 502, or portions thereof, may be stored in a remote memory storage device. By way of example, remote application programs 558 reside on a memory device of remote computer 548. For purposes of illustration, application programs and other executable program components such as the operating system are illustrated herein as discrete blocks, although it is recognized that such programs and components reside at various times in different storage components of the computing device 502, and are executed by the data processor(s) of the computer. It will be appreciated that the network connections shown and described are exemplary and other means of establishing a communications link between the computers may be used.

Various modules and techniques may be described herein in the general context of computer executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on, or transmitted across, some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although systems, media, methods, approaches, processes, etc. have been described in language specific to structural and functional features and/or methods, it is to be understood that the invention defined in the appended claims is not necessarily limited to the specific features or methods described. Rather, the specific features and methods are disclosed as exemplary forms of implementing the claimed invention.

The invention claimed is:

1. A computer-readable storage device encoded with instructions that, based on execution by a hardware processor, configure the hardware processor to:

provide first information to a client to generate a client credential and a premaster secret;

authenticate the client at a first server based at least in part on the client credential and the premaster secret;

provide second information from the first server to an authentication authority, the second information sufficient for proving to the authentication authority that the first server authenticated the client; and pass the authentication of the client from the first server to a second server to provide the client authentication to the second server.

2. The computer-readable storage device of claim 1, wherein the authentication authority includes an authentication server.

3. The computer-readable storage device of claim 1, wherein at least one of:

the authentication of the client at the first server is based at least in part on a Secure Sockets Layer/Transport Layer Security (SSL/TLS) handshake; or the proving to the authentication authority that the first server authenticated the client is based at least in part on a Secure Sockets Layer/Transport Layer Security (SSL/TLS) handshake.

4. The computer-readable storage device of claim 1, the hardware processor to further provide third information to the client to generate an exchange message, and wherein the exchange message generated by the client includes a randomly generated number in response to fourth information included within a client hello communication and a server hello communication.

5. The computer-readable storage device of claim 4, wherein the randomly generated number is based at least in part on a client's date and time and at least in part on another randomly generated number used to generate the premaster secret.

6. The computer-readable storage device of claim 1, the hardware processor to further generate a master secret by the first server based at least in part on the premaster secret, a server hello communication, and a client hello communication.

7. The computer-readable storage device of claim 6, the hardware processor to further generate copies of session keys at the first sever using the master secret.

8. The computer-readable storage device of claim 1, further comprising checking by the first server that the client credentials have not been revoked based at least in part on the client credentials being included in a user's entry.

9. The computer-readable storage media of claim 1, wherein passing the authentication of the client from the first server to the second server comprises using a first ticket generated by the authentication authority for authenticating the client to the first server, and using a second ticket generated by the authentication authority, based at least in part on the first ticket, for authenticating the client to the second server.

10. The computer-readable storage media of claim 9, wherein the first ticket is generated based at least in part on a pass-through with evidence received by the authentication authority, and the second ticket is generated based at least in part on the first ticket.

11. The computer-readable storage media of claim 10, wherein the pass-through with evidence comprises the client credential, a credential verify message, and a nonce.

12. A method comprising:
- under control of one or more hardware processors configured with executable instructions:
  - providing first information to a client to generate a client credential and a premaster secret;
  - authenticating the client at a first server based at least in part on the client credential and the premaster secret;
  - providing second information from the first server to an authentication authority, the second information sufficient for proving to the authentication authority that the first server authenticated the client; and
  - passing the authentication of the client from the first server to a second server to provide the client authentication to the second server.

13. The method of claim 12, wherein:
- the authentication of the client at the first server is based at least in part on a Secure Sockets Layer/Transport Layer Security (SSL/TLS) handshake; and
- the proving to the authentication authority that the first server authenticated the client is based at least in part on a Secure Sockets Layer/Transport Layer Security (SSL/TLS) handshake.

14. The method of claim 12, the acts further comprising:
- providing third information to the client to generate an exchange message, and wherein the exchange message generated by the client includes a randomly generated number in response to fourth information included within a client hello communication and a server hello communication, the randomly generated number being based at least in part on a client's date and time and on another randomly generated number used to generate the premaster secret.

15. The method of claim 12, the acts further comprising:
- generating a master secret by the first server based at least in part on the premaster secret, a server hello communication, and a client hello communication; and
- generating copies of session keys at the first sever using the master secret.

16. A system comprising:
- one or more hardware processors; and
- memory storing instructions that, when executed, configure the one or more hardware processors to:
  - provide first information to a client to generate a client credential and a premaster secret;
  - authenticate the client at a first server of the system based at least in part on the client credential and the premaster secret;
  - provide second information from the first server to an authentication authority, the second information sufficient for proving to the authentication authority that the first server authenticated the client; and
  - pass the authentication of the client from the first server to a second server to provide the client authentication to the second server.

17. The system of claim 16, wherein:
- the authentication of the client at the first server is based at least in part on a Secure Sockets Layer/Transport Layer Security (SSL/TLS) handshake; and
- the proving to the authentication authority that the first server authenticated the client is based at least in part on a Secure Sockets Layer/Transport Layer Security (SSL/TLS) handshake.

18. The system of claim 16, the hardware processor to further provide third information to the client to generate an exchange message, and wherein the exchange message generated by the client includes a randomly generated number in response to fourth information included within a client hello communication and a server hello communication, the randomly generated number being based at least in part on a client's date and time and on another randomly generated number used to generate the premaster secret.

19. The system of claim 16, the hardware processor to further generate a master secret by the first server based at least in part on the premaster secret, a server hello communication, and a client hello communication; and
- generate copies of session keys at the first sever using the master secret.

20. A computer-readable storage device encoded with instructions that, based on execution by a hardware processor, configure the hardware processor to:
- authenticate a client at a first server based at least in part on a client credential and a premaster secret;
- provide information from the first server to an authentication authority, the information sufficient to enable the authentication authority to verify the first server's authentication of the client; and
- subsequent to the authentication authority verifying the first server's authentication of the client, provide the authentication of the client from the first server to a second server.

21. The computer-readable storage device of claim 20, wherein the information sufficient to enable the authentication authority to verify the first server's authentication of the client comprises the client credential, a credential verify message, and a nonce.

22. A method comprising:
- under control of one or more hardware processors configured with executable instructions:
  - authenticating a client at a first server based at least in part on a client credential and a premaster secret;
  - providing information from the first server to an authentication authority, the information sufficient to enable the authentication authority to verify the first server's authentication of the client; and subsequent to the authentication authority verifying the first server's authentication of the client, providing the authentication of the client from the first server to a second server.

23. A system comprising:

one or more hardware processors; and memory storing instructions that, when executed, configure the one or more hardware processors to:

authenticate a client at a first server based at least in part on a client credential and a premaster secret;

provide information from the first server to an authentication authority, the information sufficient to enable the authentication authority to verify the first server's authentication of the client; and subsequent to the authentication authority verifying the first server's authentication of the client, provide the authentication of the client from the first server to a second server.

24. A computer-readable storage device encoded with instructions that, based on execution by a hardware processor, configure the hardware processor to:

authenticate a client at a first server based at least in part on a client credential and a premaster secret; and provide information from the first server to an authentication authority, the information sufficient to enable the authentication authority to verify the first server's authentication of the client, a second server receiving the first server's authentication of the client subsequent to the authentication authority verifying the first server's authentication of the client.

25. A method comprising:

authenticating a client at a first server based at least in part on a client credential and a premaster secret; and providing information from the first server to an authentication authority, the information sufficient to enable the authentication authority to verify the first server's authentication of the client, a second server receiving the first server's authentication of the client subsequent to the authentication authority verifying the first server's authentication of the client.

26. A system comprising:

one or more hardware processors; and memory storing instructions that, when executed, configure the one or more hardware processors to:

authenticate a client at a first server based at least in part on a client credential and a premaster secret; and provide information from the first server to an authentication authority, the information sufficient to enable the authentication authority to verify the first server's authentication of the client, a second server receiving the first server's authentication of the client subsequent to the authentication authority verifying the first server's authentication of the client.

* * * * *